United States Patent [19]
McGinn

[11] Patent Number: 4,938,334
[45] Date of Patent: Jul. 3, 1990

[54] WORKPIECE TRANSPORT SYSTEM

[75] Inventor: Terrance E. McGinn, Sellersville, Pa.

[73] Assignee: PS Group, Inc., Telford, Pa.

[21] Appl. No.: 206,818

[22] Filed: Jun. 15, 1988

[51] Int. Cl.⁵ .............................................. B65G 47/00
[52] U.S. Cl. .................................. 198/346.1; 198/414
[58] Field of Search ................. 198/346.1, 346.2, 414, 198/465.3; 414/223

[56] References Cited

U.S. PATENT DOCUMENTS

| | | | |
|---|---|---|---|
| 3,099,873 | 8/1963 | Brainard et al. | 198/346.1 X |
| 4,024,944 | 5/1977 | Adams et al. | 198/414 X |
| 4,457,419 | 7/1984 | Ogami et al. | 198/414 X |

FOREIGN PATENT DOCUMENTS

| | | | |
|---|---|---|---|
| 2205153 | 8/1973 | Fed. Rep. of Germany | 198/414 |
| 2250162 | 4/1974 | Fed. Rep. of Germany | 198/346.2 |

Primary Examiner—Robert J. Spar
Assistant Examiner—Cheryl L. Gastineau
Attorney, Agent, or Firm—Joseph W. Molasky

[57] ABSTRACT

A lifting and rotating device for use with a workpiece transport system is disclosed. The device lifts a workpiece carrier off of a conveyor system and accurately rotates the workpiece carrier to a stop position located at any position throughout 360° of rotation from the start position to provide access to any pre-determined side of the workpiece supported on the workpiece carrier from a common point at the work station.

16 Claims, 5 Drawing Sheets

WORKPIECE TRANSPORT SYSTEM

BACKGROUND OF THE INVENTION

1. Field of the Invention

This invention relates generally to the field of workpiece transporting systems wherein a workpiece carrier is moved along a conveyor from station to station as various assembly, machining, processing or test operations are performed on workpieces supported thereon. Transport systems of the indicated type are capable of synchronous or non-synchronous pallet transport, i.e., the pallets can move dependently or independently of each other.

More particularly, the invention relates to lifting and rotating devices for use with the conveyors. These devices lift a workpiece carrier off the conveyor system and position the same for having work performed on the workpiece by a robot or the like.

2. Description of the Prior Art

There have been provided lifting and rotating devices of the indicated type. Typical of these prior art devices is the "lift and turning unit" of Bosch, GmbH which is constructed for the lifting and turning of workpiece pallets by 0-180° within steps of 15°. This device operates by lifting the pallet from the conveyor belt, turning the pallet by 0-180° within steps of 15°, reversing to 0° and returning the pallet to the conveyor belt. However, these prior art devices are not entirely satisfactory since they are limited in the precision of the positioning of the workpiece relative to the work station and there is limited control over the rotational movement.

SUMMARY OF THE INVENTION

It is a general object of this invention to provide a novel lifting and rotating device for use with a workpiece transport system wherein the workpiece carrier can be lifted off the conveyor system and accurately rotated to any number of programmable pre-set positions at a controlled speed of rotation.

Another object of the invention is to provide a workpiece lifting and rotating device of the indicated type which will rotate the workpiece carrier using acceleration and deceleration at both ends of the rotating mode.

Another object of the invention is to provide a lifting and rotating device of the indicated type which will allow access to all sides of the workpiece on the workpiece carrier from a common point of a work station.

Briefly stated, the general objects of the invention are achieved by a construction comprising means for conveying a workpiece carrier along a path to and away from a work station and means for lifting and rotating the workpiece carrier at said work station to provide access to any predetermined side of the workpiece supported on the workpiece carrier from a common point at the work station. The lifting and rotating device includes a support member constructed and arranged to engage the workpiece carrier from the underside thereof, means for moving the support member vertically between a rest position and a raised position along a vertical axis, and means for rotating the support member about the vertical axis from a start position to a stop position located at any position throughout 360° of rotation from said start position. The rotation means includes a D.C. drive motor for causing the rotation of the support member and control means for the motor so that it rotates the support member at controlled speeds to any of a plurality of programmable pre-set angular positions using acceleration and deceleration at the ends of the rotating mode.

DETAILED DESCRIPTION OF THE PREFERRED EMBODIMENT

Figure 1:
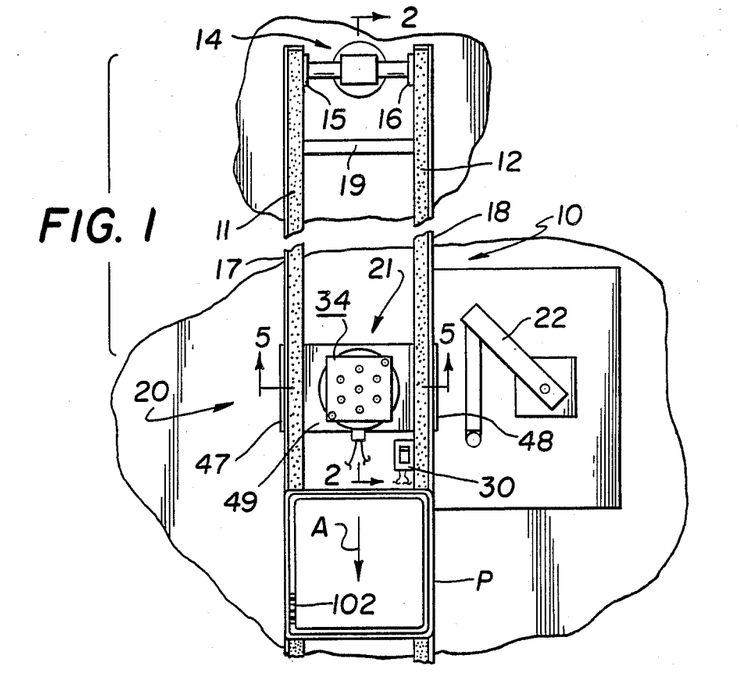
FIG. 1 is a top plan view of part of a workpiece transport system in accordance with the invention.
Figure 2:
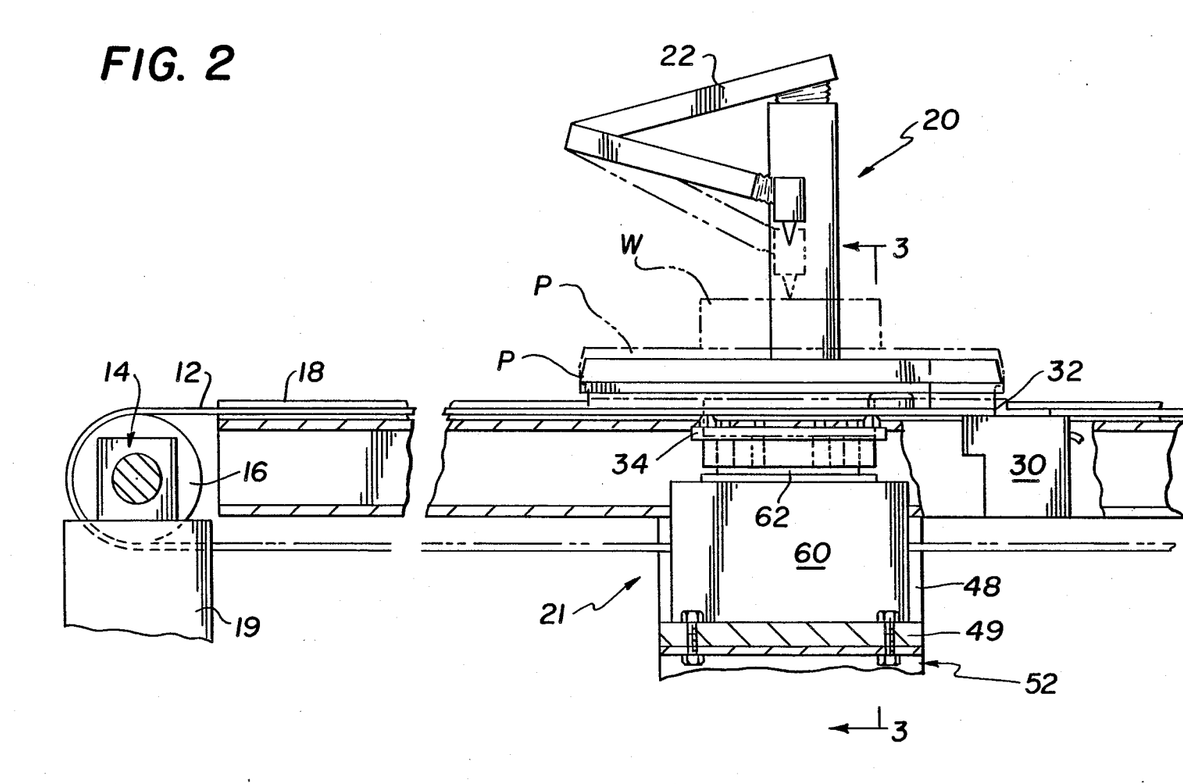
FIG. 2 is a cross-sectional view taken generally on line 2—2 of FIG. 1.
Figure 3:
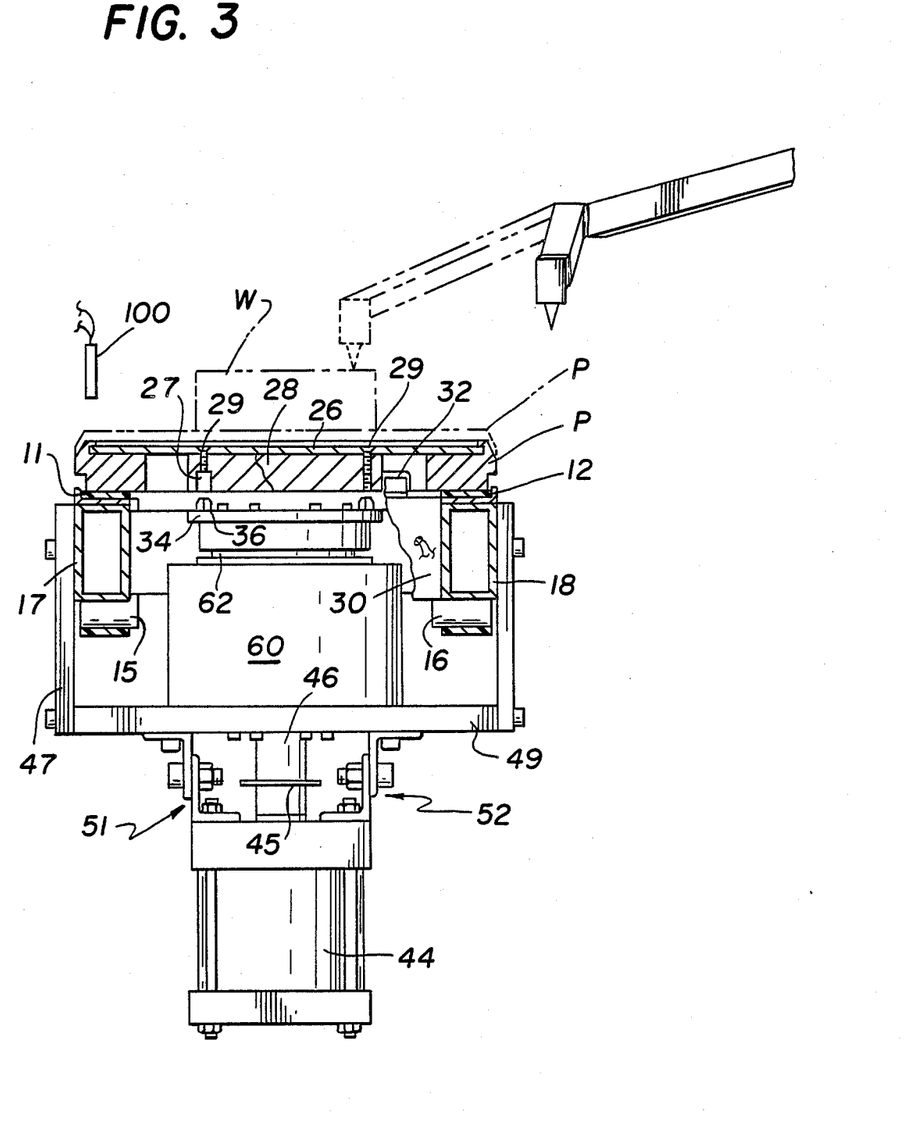
FIG. 3 is a cross-sectional view taken generally on line 3—3 of FIG. 2.

In FIG. 1 there is shown a workpiece transport system for transporting a workpiece carrier (such as a pallet) to and away from a work station. The system comprises a linear double belt, friction drive conveyor 10 comprising a pair of endless belts 11 and 12 driven by a drive motor assembly 14, which includes an electric motor having its output shaft connected to drive wheels 15 and 16 which frictionally drive the pair of endless belts 11 and 12, respectively. As is conventional in the art, belts 11 and 12 are mounted so that they are tensioned to provide the frictional driving contact between the drive wheels 15 and 16 and the belts 11 and 12. In a typical workpiece transport system, conveyor 10 transports a pallet P having a workpiece W supported thereon from station to station along the length of the conveyor 10, the pallet P being positioned to rest loosely on the belts 11 and 12 which are caused to move continuously by the drive motor assembly 14. In FIG. 1 there is shown only one work station 20 wherein there is provided a robot means 22 having an arm for performing work on the workpiece W (as is best shown in FIGS. 2 and 3). The belts 11 and 12, which are driven continuously by the drive motor assembly 14, are guided in tracks formed by conveyor sections 17 and 18 supported on posts 19 spaced along the conveyor 10.

Figure 4:
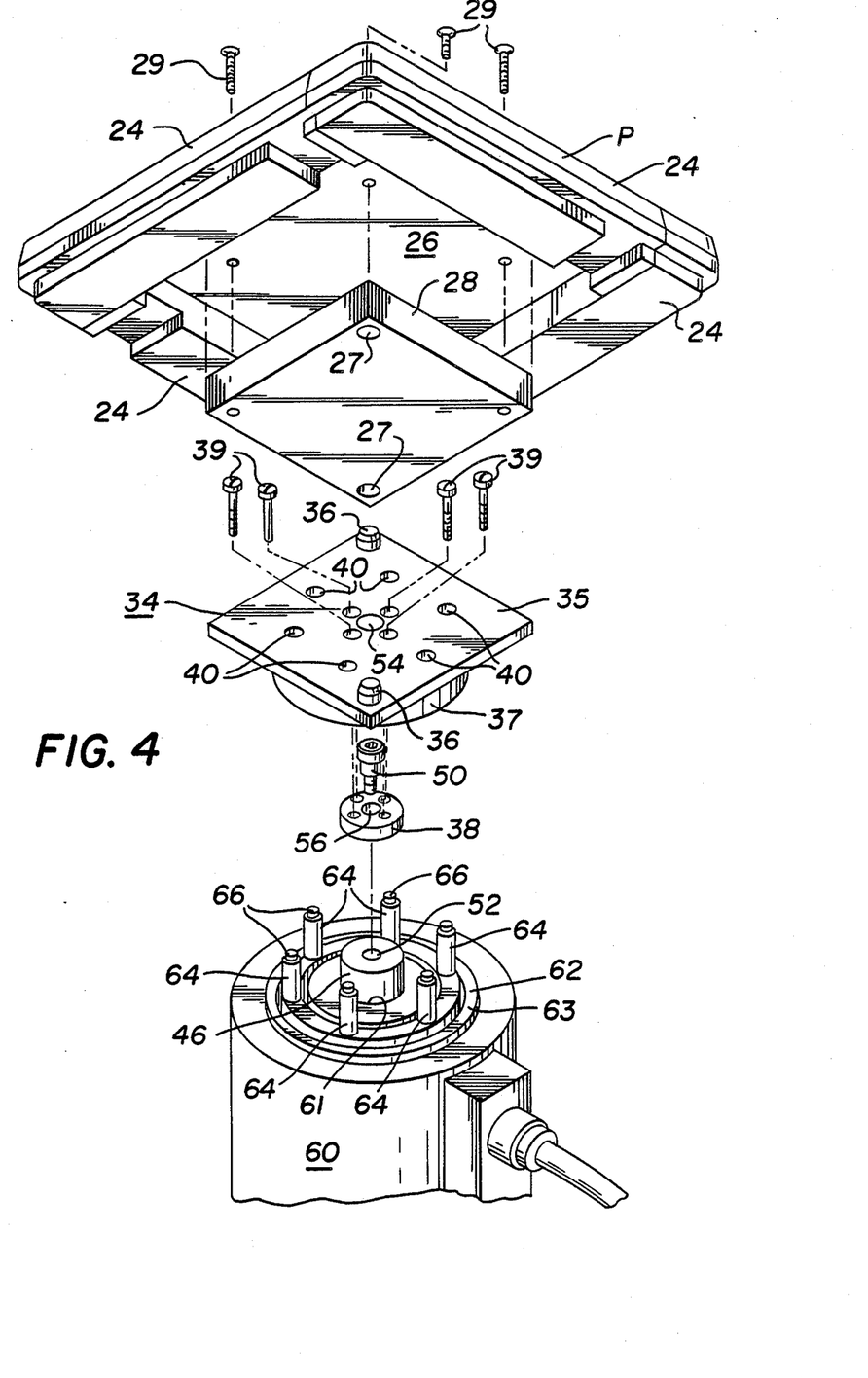
FIG. 4 is an exploded isometric view of a part of the lifting and turning mechanism in accordance with the invention.

The pallet P is best shown in FIG. 4 and is of a modular construction comprising four identical runners 24 interconnected at their ends to form a rectangular frame and a top plate 26 mounted on top of the four runners 24 in recesses thereof. The top plate 26 provides a support for the workpiece W. The pallet P is commercially available and is a conventional construction well known in the art.

In the use of a typical workpiece transport system, there are provided a plurality of work stations along the length of the conveyor 10 and pallets P carried by conveyor 10 are stopped at each of these work stations by the use of stop gates such as the stop gate 30 shown associated with work station 20. The stop gates hold the pallets P in a stationary position at each work station while the continuously driven belts 11 and 12 continue to slide underneath them. After completion of the operation to be performed at each work station, the pallet is released by the associated stop gate and is transported to the next work station, and so on. The release of the pallet P at each work station is achieved by opening the stop gate associated therewith by an appropriate sequence control at each of the work stations. Typically, at the end of an assembly line, for example, the finished workpiece is removed from the pallet and the empty pallet is returned to a desired location as by a rectangular conveyor arrangement wherein the transport and return of the pallet is performed on one level. In FIG. 1, the pallet P is shown moving in the direction of the arrow A away from the work station 20 for clarity of illustration of the lifting and rotating device located at this work station 20.

Figure 5:
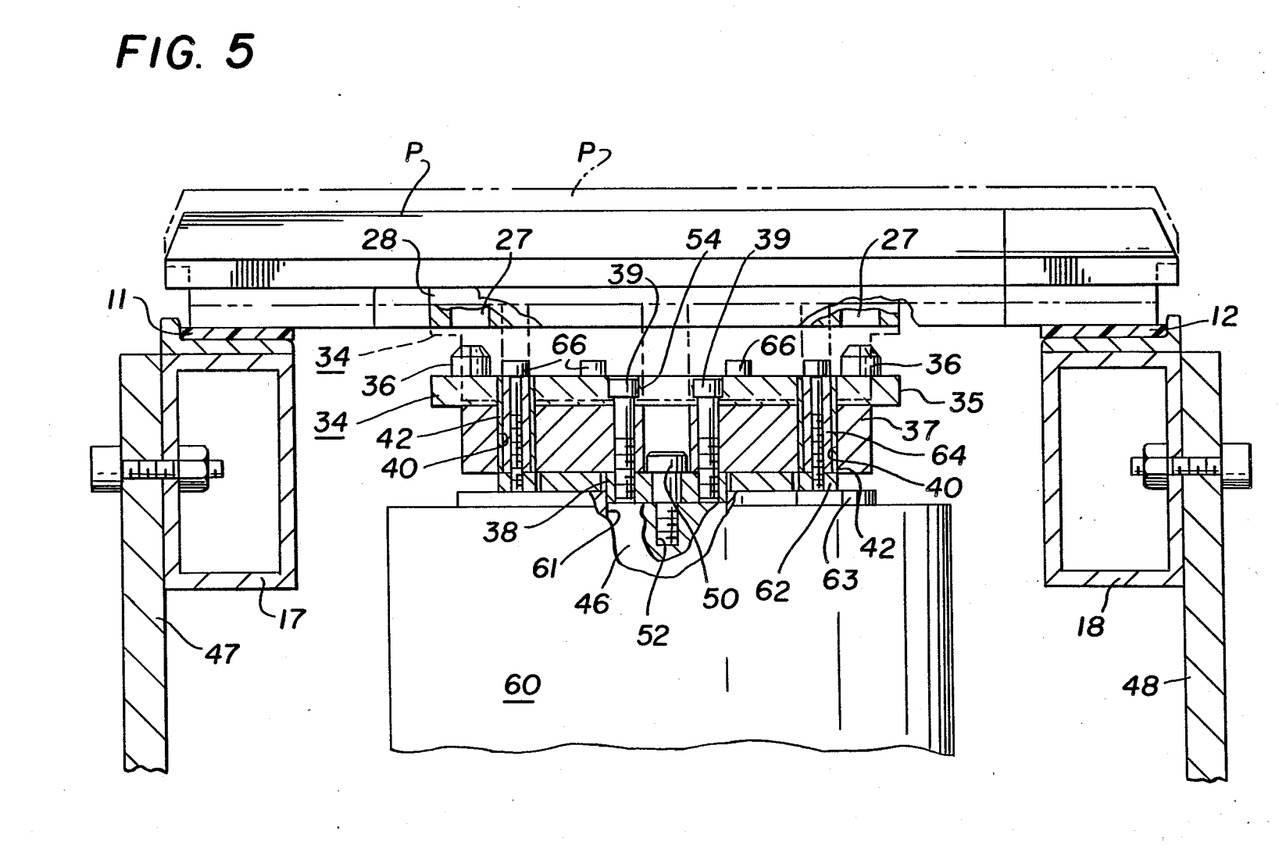
FIG. 5 is a sectional view taken on line 5—5 of FIG. 1.

In FIGS. 2, 3 and 5 the pallet P is shown in the stopped position at work station 20 provided with the robot means 22. The stop gate 30 is in the stopping condition whereby a stop member 32 engages the forward end of the pallet P to hold the same in the desired stopped position in front of the robot means 22 while the belts 11 and 12 move thereunder.

In accordance with the invention, there is provided a novel means, indicated generally at 21, for lifting and rotating the pallet P at work station 20 to position the same to provide access to any pre-determined side of the workpiece W supported on the pallet P from a common point at the work station 20. Briefly stated, such means comprises a support member constructed and arranged to engage the pallet P from the underside thereof, lift means for moving the pallet P vertically between a rest position and a raised position along a vertical axis, and rotation means for rotating the pallet P about the vertical axis from a start position to any number of stop positions located in any positions throughout 360° or more of rotation from the start position.

The novel lifting and rotating means 21 in accordance with the invention comprises a support member 34 including a rectangular shot pin plate 35, which has a pair of shot pins 36 mounted at corner portions thereon and projecting upwardly from the upper surface thereof. The shot pins 36 cooperate with a pair of locator holes 27 in a locator plate 28 mounted on the underside of the top plate 26 of the pallet P by flat head mounting screws 29, as is best shown in FIG. 4. The shot pins 36 are tapered at their upper ends for guiding the same into locator holes 27 and fit precisely within the locator holes 27 to accurately position the pallet P on support member 34. Support member 34 includes a circular lower lift plate 37 secured to shot pin plate 35 as by welding, to form a unitary structure. An annular-shaped radial bearing 38 is mounted on the underside of the lower lift plate 37 by means of four mounting screws 39 received in counterbores formed in support member 34 as best shown in FIG. 5. The support member 34 is provided with six vertically extending bores 40 located on a circle and arranged to be circumferentially equally spaced around said circle. Each of the bores 40 has mounted therein a sleeve bearing 42 as shown in FIG. 5.

The lift means for moving the support member 34 vertically between a rest position and a raised position along a vertical axis comprises an air-operated cylinder means 44 (FIG. 3) which includes a shaft member 46 which is actuated along a vertical axis by controlling the flow of air to the piston means (not shown) within the cylinder means 44, as is conventional in the art, the shaft member 46 being connected to said piston means. The cylinder means 44 is supported below the conveyor 10 by a support means including a pair of vertical brackets 47 and 48 secured by bolts at their upper ends to sections 17 and 18 and carrying at their lower ends a horizontally extending support plate 49. A pair of support means 51 and 52, each including two angle members with associated bolts as best shown in FIG. 3, support the cylinder means 44 below support plate 49. The cylinder means 44 is mounted so that the shaft member 46 is constructed and arranged to move on a vertical axis centered on the work station 20 and so as to be centered on a stopped pallet P on conveyor 10, the pallet P being held in the stopped condition by the stop gate 30 as described above.

Means are provided for mounting the support member 34 on the upper end of the shaft member 46 for conjoint movement therewith along a vertical axis and for rotation of the support member 34 about said vertical axis. Such mounting means comprises a shoulder bolt 50 which is arranged to be threadedly engaged at its lower threaded end within an axially extending threaded bore 52 in the upper end of the shaft member 46, as is best shown in FIG. 5. In order to mount the support member 34 on the upper end of the shaft member 46, the shoulder bolt 50 is passed through a central bore 54 in support member 34 and is constructed and arranged so that the shoulder bolt 50 seats on the upper end of shaft member 46 with its bolthead holding the radial bearing 38 in sliding contact with the upper end of the shaft member 46. Also, the cylindrical central portion of the shoulder bolt 50 is rotatably received within the central bore 56 of the bearing member 38. The parts are constructed and arranged so that when the shoulder bolt 50 is threaded into its seated position with the lower end of its central cylindrical portion seated on the upper end of the shaft member 46, the radial bearing 38 is held on the upper end of shaft member 46 in a manner so that it can rotate about the vertical axis of the shaft member 46, this mounting arrangement being apparent from a consideration of FIGS. 4 and 5. Accordingly, as the shaft member 46 is moved from its rest position (shown in solid lines in FIG. 5) to its raised position, the support member 34 will be moved conjointly therewith from the solid line position to the dashed line position shown in FIG. 5. In a like manner, the pallet P will be engaged by the support member 34 in the first part of its upward movement with the shot pins 36 moving into the locator holes 27 and, during the final part of the upward movement of support member 34, the pallet P will be lifted upwardly to move from the solid line position to the dashed line position shown in FIG. 5. The movement of the pallet P only occurs toward the end of the upward movement of the support member 34 and it is moved to a position so that the bottom of the pallet is above the conveyor belts 11 and 12 and sections 17 and 18. Also, the pallet P and the support member 34 will move downwardly with the shaft member 46 as it is returned to the rest position by the operation of the cylinder means 44 and will return to the solid line positions thereof shown in FIG. 5 as the shaft member 46 returns to its retracted rest position.

As is shown in FIG. 3, the shaft member 46 is provided with an annular sensor ring 45 at a location below the horizontal support plate 49. The sensor ring 45 cooperates with an upper and a lower sensor (not shown in FIG. 3) which senses the position of the sensor ring 45 to provide a signal to the control means for the lift and rotating means 21 to provide an indication of the position of the shaft member 46 and, accordingly, the pallet P. This signal indication is used by the control means, which will be described hereafter, to indicate when the pallet P is in its raised position above the conveyor 10 whereby it can be rotated as will be described hereafter.

The means for causing rotation of the support plate 34 comprises a direct drive motor means 60 mounted on top of the horizontal support member 49 above and aligned with the cylinder means 44. The motor means 60 has a central bore 61 adapted to slidably receive the vertically extending shaft member 46 and to permit the vertical movement thereof as described above. The motor means 60 is a direct drive type and is commercially available from the Nippon Seiko Company as Model No. RS0608. The motor means 60 is a D.C. drive motor that can be controlled to rotate in steps to any precise location throughout 360° of rotation with an accuracy of ten arc seconds. The control means for the motor means 60 will be described hereafter.

The output rotor 62 of the motor means 60 is annular, and the parts are mounted so that rotor 62 is concentric with respect to shaft member 46. Rotor 62 projects upwardly from the output end of the motor body 63, as is shown in FIG. 5. Six circumferentially equally spaced drive pins 64 are mounted on the end of the rotor 62 to extend upwardly therefrom as is best shown in FIG. 4. The drive pins 64 are secured to the end of the rotor 62 by means of long bolts 66, the shafts of which extend through the drive pins 64 to threadedly engage in mounting holes in the end of the rotor 62. The drive pins 64 have a cylindrical configuration and are constructed and arranged to fit slidably within the sleeve bearings 42 contained in the support member 34 as described above.

By this arrangement, the drive pins 64 will cause the support member 34 to rotate conjointly with the rotor 62 of the motor means 60 as the rotor 62 is rotated about the vertical axis of the lifting and rotating means 21. The control of the motor means to cause the precise rotation desired at the work station 20 will be described hereafter. Also, the parts are constructed and arranged so that when the shaft member 46 is moved from its rest position upwardly to its raised position, the drive pins 64 will remain within the sleeve bearings 42 to permit conjoint rotation of the support member 34 and the rotor in any vertical position of the shaft member 46. It will be apparent that there should be no rotation of the support member 34 while it is engaged with a pallet P that remains on a level in contact with the belts 11 and 12 and the stop gate 30. This is taken care of by the control means.

In FIGS. 2 and 5 the pallet P is shown in the rest and raised positions thereof in solid and dashed lines, respectively. In the rest position, the pallet P is held by the stop gate 30, by engagement with stop member 32, while the belts 11 and 12 rotate thereunder. In the raised position, the pallet P is positioned above the conveyor belts 11 and 12 and the stop gate 30 and is free to be rotated to any desired position so that it can be operated on by the robot means 22 at the work station 20 pursuant to a programmed sequence.

Means are provided for controlling the motor means 60 so that it rotates the support member 24, and the pallet P supported thereon, at controlled speeds to any number of programmable pre-set angular positions. To this end, there is provided a microprocessor controlled D.C drive motor means 60 of the type described above and control means, shown in FIG. 6, for the motor means 60 which will rotate the rotor 62 a predetermined amount at controlled velocities to provide acceleration and deceleration at the starting and stopping ends of the rotating mode. The stopping positions of the rotor 62 are fully adjustable from 0–360° both in the clockwise and counterclockwise direction with an accuracy of less than ten arc seconds.

Figure 6:
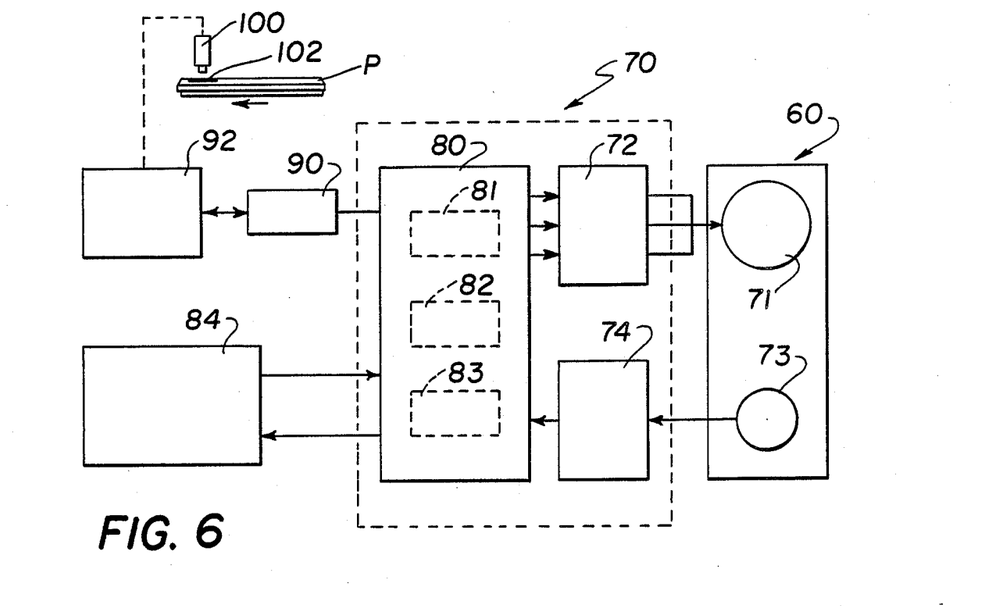
FIG. 6 is a partially schematic showing of the control for the motor that rotates the workpiece carrier.

The motor means 60 and the control therefor is commercially available from Nippon Seiko Company USA of Santa Rose, California and Chicago, Illinois and is designated the "MEGATORQUE MOTOR SYSTEM". This system is described in detail in the copyrighted Users Manual available from NSK (formally Motornetics Corporation) and entitled "MEGATORQUE MOTOR SYSTEM-EE and EK Type Driver Systems". FIG. 6 is a block diagram of said motor system illustrating the interrelationship of the functional blocks within the driver unit. The motor system consists of all the elements required for a complete closed loop servo motor system incorporated into two units, i.e., the motor unit and the driver unit.

The motor unit, herein designated motor means 60, consists of a direct drive brushless motor 71, a built-in high resolution brushless resolver 73 and a precision bearing. The driver unit, indicated at 70, consists of a power amplifier 72, a resolver interface 74 and a digital signal processor 80 including digital motor controller circuits 81, 82 and 83. The driver unit 70 includes all the circuits necessary to provide a position or velocity servo loop, namely, digital motion controller, servo compensation, brushless commutation logic and power amplifier. To this end, digital signal processor includes a direct digital motor commutation circuit 81, a position control circuit 82, and a velocity servo circuit 83.

The motor 71 is designed to be able to produce high torque at low speeds whereby it is suitable for the direct drive application of the present invention. Each stator of the motor 71 is constructed of laminated iron sheets with eighteen poles stamped into the laminations, each pole having one set of copper windings around it to provide the magnetic field. The windings are wired in series so as to provide three sets of windings seen by the amplifier, with each winding having twelve pole pieces. The face of each pole piece has many teeth, such teeth serving to focus the magnetic energy into a series of discrete points along the pole face, thereby providing a device similar to a stepping motor. The contruction provides hundreds of these pole points around the full turn of the motor 71 depending on the motor size. The rotor 62 of the motor means 60 is a cylindrical ring constructed of the same iron laminations and with the same tooth structure as the stator, but without windings or pole pieces. The rotor 62 serves to conduct the magnetic field from an inner stator across the rotor 62 to the adjacent pole piece on an outer stator, and back again. The rotor teeth serve to focus the magnetic field into discrete points around the circumference of the rotor 62, the combined effect of these points of focused magnetic field around the inner and outer stators and the rotor serving to act like electronic gear reduction, multiplying the torque hundreds of times while reducing the speed by the same amount. For each full electrical cycle of commutation, the motor 71 rotates through one magnetic cycle which is the angular distance between adjacent teeth, there being, typically, one hundred and fifty electrical cycles per motor revolution. Commutation of the motor phases is performed without brushes by direct control of a high speed microprocessor in the driver unit 70, and it is the phase relationship of the three motor phases that determine the direction of rotation. Since the motor 71 uses the teeth to focus the magnetic field, no magnets are used in the motor.

The driver unit 70 comprises all of the circuits that are required to operate the motor system in position, velocity and torque control modes. These circuit functions comprise the power amplifier 72, the resolver interface 74, and the digital signal processor 80. The resolver interface 74 and the digital signal processor 80 are provided in a single printed circuit board which is accessible to the user on the side of the driver unit 70. The interrelationship of these functional circuit blocks within the driver unit 70 is illustrated in FIG. 6.

The digital signal processor 80, which is a subsystem and part of the printed circuit board, is constructed to convert all analog signals to digital form. The microprocessor on the printed circuit board handles all of the motor control functions in the digital form. In operation, the digital signal processor 80 receives command signals in either analog or digital form depending on the options configuration in which the driver unit 70 is arranged. The command parameter can be position, velocity or torque. The digital signal processor 80 compares the commanded variable with the actual measured value of the controlled variable, and makes small corrections continuously so that the motor 71 always obeys the command. The digital signal processor 80 receives its feedback information from the motor's built-in resolver 73 by way of the resolver interface circuit subsystem. There may be provided digital filters which alter the motor behavior to improve repeatability, or to eliminate mechanical resonances.

The digital signal processor 80 uses the digitized information obtained from the resolver interface 74 to determine when to apply current to the motor phase and how much. The amount of current applied to each motor phase is determined by a mathematical function that takes into account the torque command level, the motor position, and the motor velocity. These factors are taken into account to compensate for motor non-linearities and produce a smooth output torque.

The power amplifier 72 is a current regulated unipolar switching power amplifier. The motor windings are driven by the power amplifier 72 which delivers the current designated by the commutation logic circuit to each of the motor phases.

The circuit of the resolver interface 74 provides positions and velocity feedback signals. This circuit provides an excitation signal to the resolver 73 and receives the three phase resolver analog signals by way of a resolver cable. These signals are decoded by the resolver to digital convertor (RDC) to produce digital cyclic absolute position and velocity feedback signals. The cyclic absolute position data is used by the commutation circuits 81 and is used to generate quadrature position feedback for use with an external positions controller. In addition, the cyclic absolute position is used internally to maintain absolute position data. This data is available to the user by way of an RS 232C controller 90 and it is used with the internal positions control functions.

As described in said Users Manual, there are many driver unit options in which the system can be arranged. In accordance with one option, there is provided an RS 232C flexible motion controller 90. In this mode, motor position, velocity and acceleration can be commanded in real time by way of the RS 232C controller 90. This mode offers great flexibility for robotic and other non-repetitive motion control applications such as is involved in the present invention.

In accordance with another mode as shown in FIG. 6, there is provided an RS 232C controller 90 programmed by a computer 92, such as a personal computer or the like, and a pulse train position command input. In this mode, the driver unit 70 accepts digital pulses as incremental position move commands. The driver unit recognizes pulses in three formats whereby the motor positions can be controlled by any device that issues digital pulses in one of the formats, such as a stepper motor indexer 84 shown in FIG. 6. Although the motor 71 will obey stepping motor position commands in this mode, the motor 71 still operates as a servo motor providing all the advantages of servo loop control.

From predetermined calculations and experience it will be determined that there are desirable amounts of accelerations and decelerations for a particular rotational movement of the support member 34 in the operation of the lifting and rotating means 21. This desired acceleration and deceleration is programmed into the control system and these values remain constant for all movements of the rotor 62 which effects rotation of the support member 34. By way of a typical example, the acceleration is achieved in the first 25 % of the total rotational movement and the deceleration is achieved in the last 25 % of the rotational movement.

In accordance with another control option, the motor control system could utilize an external signal, or a set of signals, from a pallet sensing device, such as a bar code reader, to perform a pre-determined programmed set of instructions for the operation of the motor means 60. To this end, a bar code reader 100 is positioned in the path of movement of the pallet P to read a bar code 102 on the pallet P as it moves to the work station 20. After reading the coded information on the bar code 102, the bar code reader 100 delivers a signal to the computer 92 for controlling operation of the driver unit 70 through controller 90. Thus, as a first example, the external signals may indicate that there are two parts on the workpiece carrier, and, therefore, the motor means 60 is caused to rotate clockwise from 0° to 10° 30', then clockwise to 190° 30', and then counterclockwise to 0°. Further, as another example, the external signal may indicate that there are eight parts on the workpiece carrier wherefore the motor means 60 is caused to rotate counterclockwise to 45°, then 90°, then every 45° until it returns to 0° and each of the eight parts has been operated on by the robot means at the work station.

It will be apparent that various changes may be made in the construction and arrangement of parts without departing from the scope of the invention which is defined by the following claims. For example, the term "workpiece carrier" as used herein is intended to cover workpiece carriers including pallets and fixtures supported by the pallets which are adapted to be engaged by the lifting and rotating means in accordance with the invention.

What is claimed is:

1. In a workpiece transport system for transporting a workpiece carrier to an away from a work station,
   a workpiece carrier,
   means for conveying said workpiece carrier along a path to and away from the work station,
   means for lifting and rotating said workpiece carrier at said work station to provide access to any predetermined side of a workpiece support on said workpiece carrier from a common point at said work station, said means for lifting and rotating said workpiece including a support member constructed and arranged to engage said workpiece carrier from the underside thereof, direct drive lift means for moving said support member vertically with a high degree of accuracy between a rest position and a raised position along a vertical axis, said lift means including a first actuating means having a vertically movable actuating member and means connecting said actuating member directly to said support member, and direct drive rotation means for rotating said support member with a high degree of accuracy about said vertical axis from a start position in a direct path of travel to a precise predetermined stop position located at any of a plurality of angular positions throughout 360° of rotation from said start position, said rotation means including a second actuating means having a rotatable actuating member and means engaging said rotatable actuating member directly to said support member.

2. In a workpiece transport system according to claim 1 wherein said rotation means comprises a direct current motor of a direct drive construction controllable to rotate in steps to any precise location throughout 360° of rotation and microprocessor means for controlling operation of said motor to control the positioning and the acceleration and deceleration thereof.

3. A transport system according to claim 2 wherein said motor is controllable to rotate in said steps throughout 360° of rotation with an accuracy of at least about ten arc seconds, said motor and said control means therefor comprising a complete closed loop servo motor system with direct feedback.

4. In a workpiece transport system for transporting a workpiece carrier to and away from a work station,
a workpiece carrier,
means for conveying said workpiece carrier along a path to and away from the work station,
means for lifting and rotating said workpeice carrier at said work station to provide access to any predetermined side of workpiece supported on said workpiece carrier from a common point at said work station,
said means for lifting and rotating said workpiece including
a support member constructed and arranged to engage said workpiece carrier from the underside thereof,
direct drive lift means for moving said support member vertically with a high degrees of accuracy between a rest position and a raised position along a vertical axis, and
direct drive rotation means for rotating said support member with a high degree of accuracy about said vertical axis from a start position to a stop position located at any of a plurality of angular positions throughout 360° of rotation from said start position, said lift means comprising a non-rotatable shaft member movable along a vertical axis, means for mounting said support member directly onto the upper end of said shaft member for conjoint movement therewith along said vertical axis and for rotation of said support member relative to said shaft member about said vertical axis.

5. A transport system according to claim 4 wherein said rotation means comprises an annular member mounted concentrically with respect to said non-rotatable shaft member and fore rotation relative thereto about said vertical axis, means for providing direct engagement between said annular member and as support member for causing a direct drive conjoint rotational movement of said annular member and said support member, and a motor means for driving said annular member through said rotational movement thereof.

6. A transport system according to claim 5 wherein said mounting means includes bearing means secured to said support member and positioned in sliding contact with said shaft member to permit relative movement between said support member and said non-rotatable shaft member.

7. A transport system according to claim 4 wherein said motor is controllable to rotate in said steps throughout 360° of rotation with an accuracy of at least about ten arc seconds.

8. In a workpiece transport system for transporting a workpiece carrier to and away from a work station,
a workpiece carrier,
means for conveying said workpiece carrier along a path to and away from the work station,
means for lifting and rotating said workpiece carrier at said work station to provide access to any predetermined side of a workpiece supported on said workpiece carrier from a common point at said work station,
said means for lifting and rotating said workpiece including
a support member constructed and arranged to engage said workpiece carrier from the underside thereof,
lift means for moving said support member vertically between a rest position and a raised position along a vertical axis,
rotation means for rotating said support member about said vertical axis from a start position to a stop position located at any position throughout 360° of rotation from said start position,
said rotation means comprising a direct current drive motor having a rotor drivingly connected to said support member for rotating the same between said start and stop positions thereof, and
means for controlling said motor to cause movement of said rotor to rotate said support member to any of a plurality of pre-determined angular positions.

9. A transport system according to claim 8 wherein said motor control means is constructed and arranged to control said motor to rotate in either direction.

10. A transport system according to claim 9 wherein said motor control means is constructed and arranged to control the velocity of rotation of said rotor to cause acceleration and deceleration thereof at the end portions of a rotation movement.

11. A transport system according to claim 10 wherein said motor control means comprises a motor driver unit constructed and arranged to control the energization of said motor and a programmed computer means for controlling operation of said motor driver unit.

12. A transport system according to claim 11 wherein said control means includes resolver means for detecting the rotative position of said motor rotor and providing feedback signals indicative of the position of said rotor and the velocity thereof.

13. In a workpiece transport system for transporting a workpiece carrier to and away from a work station,
a workpiece carrier, means for conveying said workpiece carrier along a path to and away from the work station, means for lifting and rotating said workpiece carrier at said work station to provide access to any predetermined side of a workpiece supported on said workpiece carrier from a common point at said work station, said means for lifting and rotating said workpiece including a support member constructed and arranged to engage said workpiece carrier from the underside thereof, direct drive lift means for moving said support member vertically with a high degree of accuracy between a rest position and a raised position along a vertical axis, and direct drive rotation means for rotating said support member with a high degree of accuracy about said vertical axis from a start position to a stop position located at any of a plurality of angular positions through 360° of rotation from said start position, said lift means including a fluid-operated cylinder means having an actuating rod connected directly to said support member for causing said vertical movement by a direct drive arrangement.

14. A workpiece transport system according to claim 13 wherein said cylinder means comprises a pneumatic cylinder.

15. In a workpiece transport system for transporting a workpiece carrier to and away from a work station,
a workpiece carrier, means for conveying said workpiece carrier along a path to and away from the work station, means for lifting and rotating said workpiece carrier at said work station to provide access to any predetermined side of a workpiece supported on said workpiece carrier from a commonpoint at said work station, said means for lifting and rotating said workpiece including a support member constructed and arranged to engage said workpiece carrier from the underside thereof, direct drive lift means for moving said support member vertically with a high degree of accuracy between a rest position and a raised position along a vertical axis, direct drive rotation means for rotating said support member with a high degree of accuracy about said vertical axis from a start position to a stop position located at any of a plurality of angular positions throughout 360° of rotation from said start position, means for controlling the vertical movement of said support member, and means for controlling the rotational movement of said support member to cause the same to travel from a start position less than 360° of rotation to position said workpiece carrier at a precise predetermined angular stop position at said work station.

16. A transport system according to claim 15 wherein said motor is controllable to rotate in said steps throughout 360° of rotation with an accuracy of at least about ten arc seconds.

* * * * *